July 20, 1965  A. A. HALACSY  3,195,820
METHOD FOR WINDING TOROIDAL POWER TRANSFORMERS
Filed July 13, 1961  5 Sheets-Sheet 1

INVENTOR.
ANDREW A. HALACSY
BY
ATTORNEY

July 20, 1965
A. A. HALACSY
3,195,820
METHOD FOR WINDING TOROIDAL POWER TRANSFORMERS
Filed July 13, 1961
5 Sheets-Sheet 3
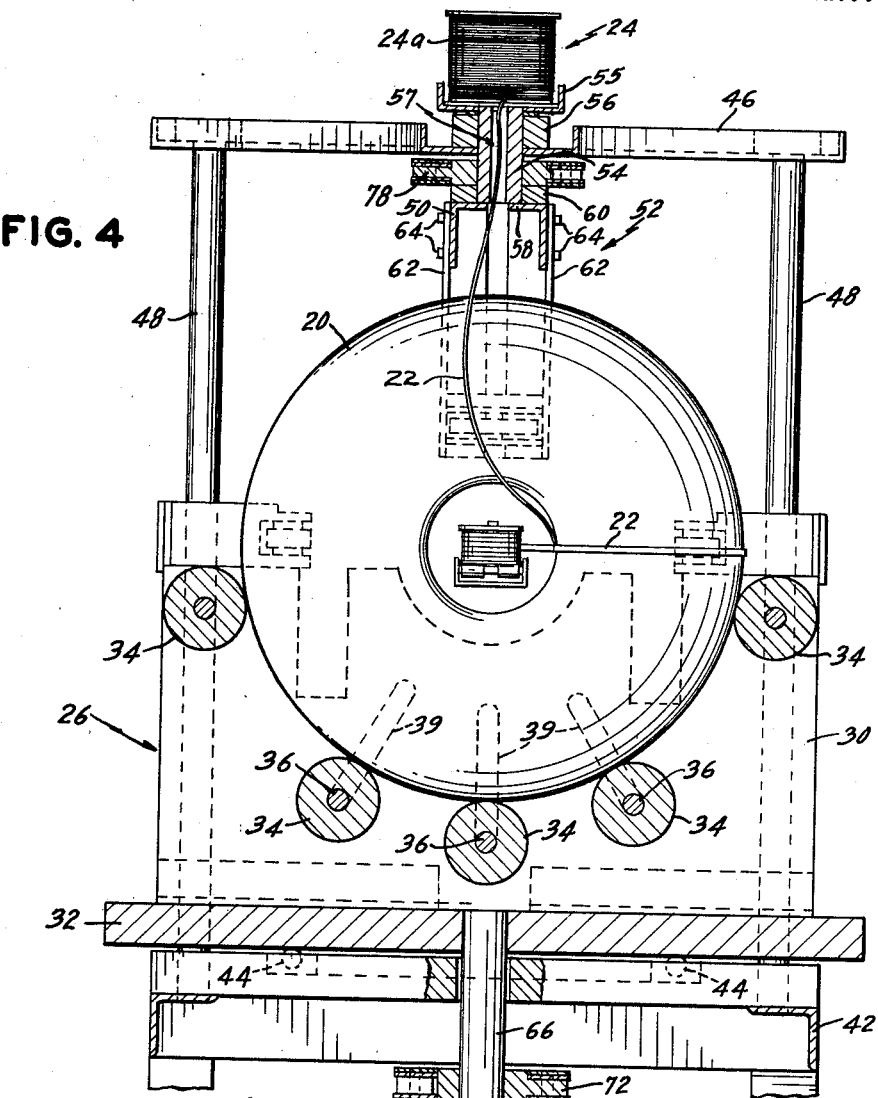
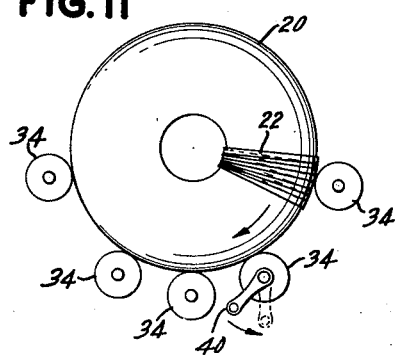
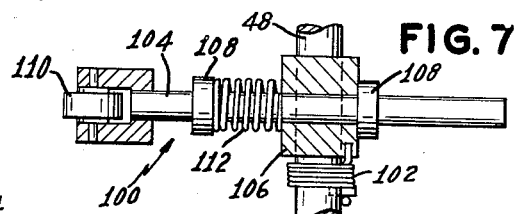
INVENTOR.
ANDREW A. HALACSY
BY
ATTORNEY

INVENTOR.
ANDREW A. HALACSY

ATTORNEY

July 20, 1965  A. A. HALACSY  3,195,820
METHOD FOR WINDING TOROIDAL POWER TRANSFORMERS
Filed July 13, 1961  5 Sheets-Sheet 5

INVENTOR.
ANDREW A. HALACSY

BY

ATTORNEY

United States Patent Office 3,195,820
Patented July 20, 1965

3,195,820
METHOD FOR WINDING TORODIAL POWER TRANSFORMERS
Andrew A. Halacsy, Elizabeth, N.J., assignor to Federal Pacific Electric Company, a corporation of Delaware
Filed July 13, 1961, Ser. No. 123,859
9 Claims. (Cl. 242—4)

This invention relates to an improved method for winding toroidal power transformers for the distribution of electrical power. So-called pole transformers are an example of what is intended.

Transformers employing cores formed as wound coils of magnetic strip and of generally rectangular shape are commonly used for power distribution. Such transformers are high in electrical efficiency, but practical methods and apparatus have not been available for making toroidal windings on a toroidal core. Currently used transformers use a current-carrying or "copper" coil that is either pre-wound or wound in situ on one leg of a wound core, and accordingly it has been necessary to form the core as a modified rectangle with at least one straight saide for the copper coil. Such an arrangement is less efficient in operation and in utilization of copper and iron, and is heavier and bulkier than would be the case if the core were toroidal and had a toroidal conductive winding with a hole in the toroidal core of minimum diameter to accommodate the turns of the toroidal conductive winding.

Small toroidal-core devices having toroidal windings are used in computers and in communications devices; and somewhat larger toroidal devices have been used as variable-autotransformers. The apparatus for making such windings and the proportions of such devices are both unsuited to application in distribution transformers. Therefore, an object of this invention is in the provision of a novel method for winding toroidal primary and secondary current-carrying coils on a toroidal core in making a distribution power transformer.

In one aspect of the invention there is provided an improved method for placing primary and secondary windings on a toroidal core for use as a distribution power transformer. The method includes the steps of positioning the core with its central axis lying in a given plane, preparing a wound length of wire in a form that can be threaded through the aperture in a core, securing the wire to the core, causing a half-turn of rotation of the core relative to the wound length of wire in a manner to keep the core axis within the given plane, whereby a partial turn of the wire is formed around the core. The wound length of wire is then passed bodily through the core and another half-turn of relative movement is once again produced between the core and the length of wire. The winding is completed by repeating the alternate steps of threading the wound supply of wire through the core and producing half-turns of core rotation in the manner described. The core is also gradually indexed about its own axis for distributing the turns of wire about the periphery of the core.

For better understanding the invention, including the foregoing and certain additional objects and features of novelty, reference is made to the following detailed description of an illustrative embodiment thereof, which is shown in the accompanying drawings. In the drawings:

FIG. 4 is an end view on an enlarged scale and in partial section taken along the line 4—4 of FIG. 2, additionally showing a supply of wire used in carrying out a particular method;

FIG. 7 is a cross-section of a portion of the wire placing apparatus taken along the line 7—7 of FIG. 5;

FIG. 8 is a cross-section of the shuttle-supporting apparatus taken along the line 8—8 of FIG. 1, shown on an enlarged scale, showing the shuttle in place;

FIG. 9 is a cross-section of the shuttle-supporting apparatus taken along the line 9—9 of FIG. 1 on an enlarged scale;

FIG. 11 is a diagrammatic view of a core and its supporting rollers, representing the progression of turns made by gradual rotation of the transformer core about its central axis.

Figure 1:
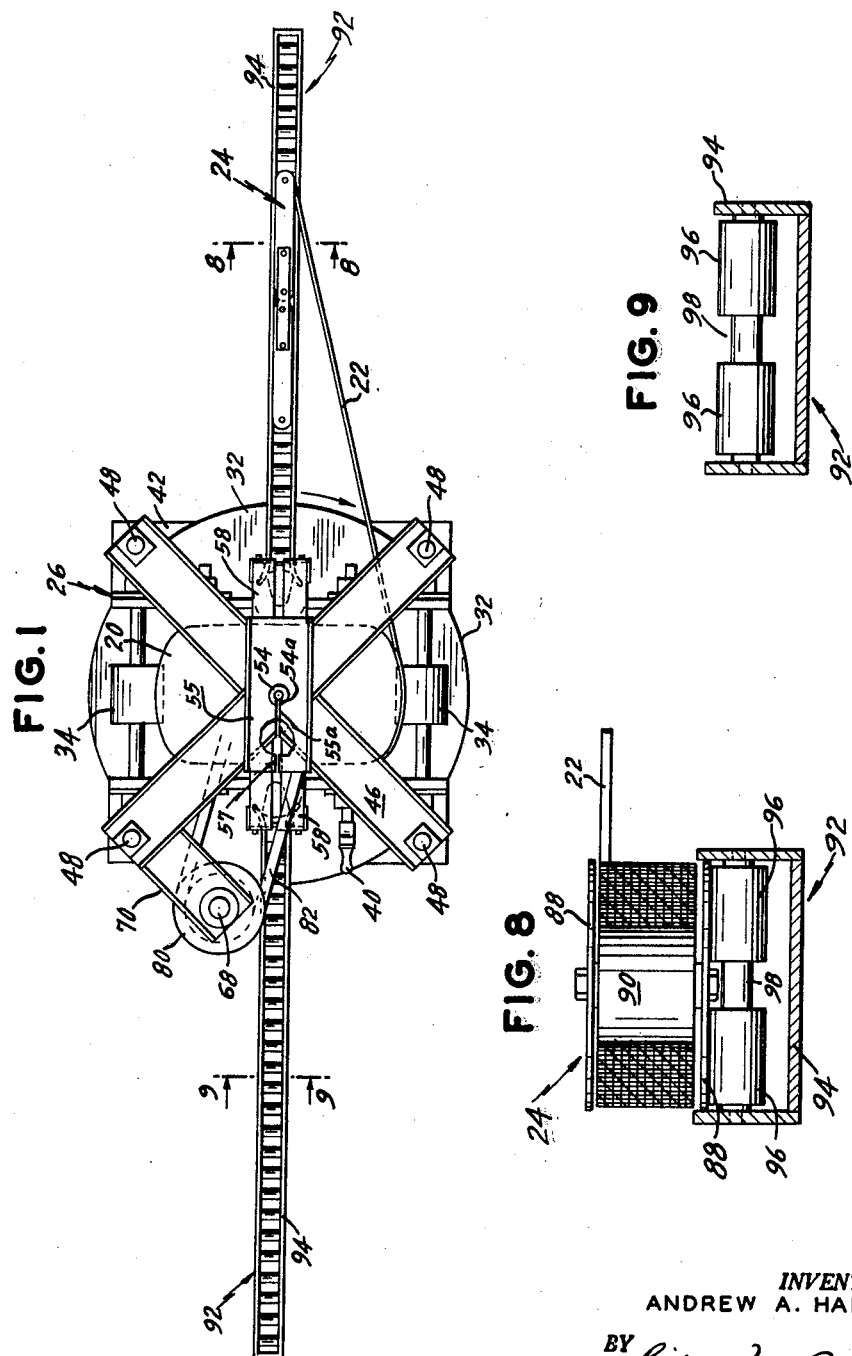
FIG. 1 is a plan view of the novel illustrative transformer winding apparatus.

Referring to the drawings, the toroidal power transformer being wound comprises a core 20 on which one or more turns of wire 22 are shown. Transformers of this type, having other new and useful features, are described in full in my co-pending U.S. applications Ser. Nos. 47,200 and 47,201 which are assigned to the assignee of this application. An illustrative size of transformer which may be fabricated in accordance with features of this invention has a wound core of silicon steel weighing 787 pounds. The core has an inner diameter of 8½ inches, an outer diameter of 21½ inches, and a height of 13¾ inches. During the manufacturing operation, some 39,260 inches of .108 inch diameter insulated copper wire are applied in discrete lengths as the primary and secondary windings, the complete transformer having an overall weight of 890 pounds exclusive of mounting, protective and cooling structures. The length of wire would, of course, be divided into the primary and secondary windings as required by the transformer design.

Figure 10A:
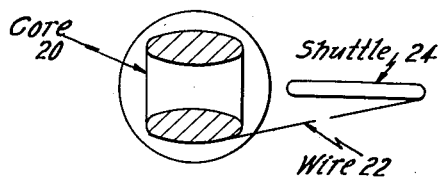
FIGS. 10a to 10i are a diagrammatic presentation of various phases in the novel winding method.
Figure 10B:
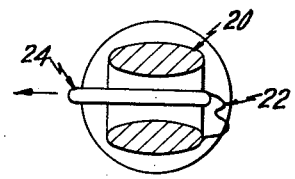
Figure 10C:
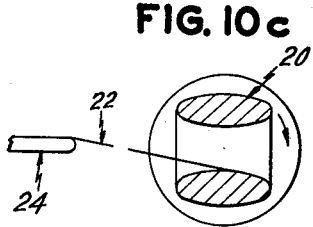
Figure 10D:
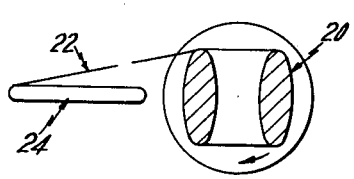
Figure 10E:
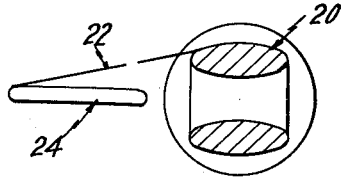
Figure 10F:
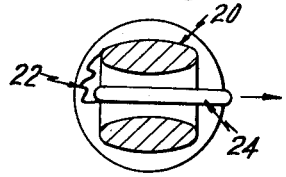
Figure 10G:
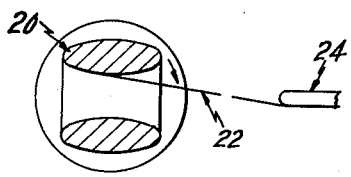
Figure 10H:
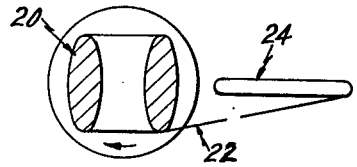
Figure 10I:
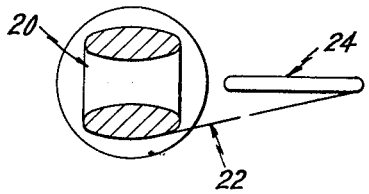

The length and cross-section of wire in a particular winding is determined by the engineering design of the transformer. The method of winding the wire on a core will first be described with reference to FIGS. 10a to 10i. Once the length of wire required for particular winding has been determined, the wire 22 is wound in a configuration capable of being passed through the aperture in the core as for example on a shuttle 24 which, when fully loaded, is able to pass through the aperture of the core with sufficient clearance for previously positioned wires. The free end of the wire 22 is secured to the core as by taping (FIG. 10a) and the shuttle 24 is then fed through the aperture or window in the core 20 (FIG. 10b). The wire is drawn taut against the core by drawing the shuttle away from the core 20 (FIG. 10c). Core 20 is then rotated through a half-revolution (FIGS. 10d and 10e). After completion of one lengthwise stroke of the shuttle and a 180° rotation of the core as thus far described, it will be recognized that a full turn has been wound about the core. The wire that initially was angled away from the lower side of the shuttle as illustrated in FIG. 10a assumes a position angled away from the upper side of the shuttle in the illustration of FIG. 10e. A full turn of wire has thus been wound around the core, and a half-turn of wire has been unwound from the shuttle. Shuttle 24 is reciprocated once again, traveling through the core as shown (FIGS. 10f and 10g). Core 20 is rotated through a second half-revolution (FIGS. 10h and 10i), thereby completing a second turn of wire about the core and restoring the parts to the condition shown in FIG. 10a.

The second stroke of the shuttle (FIGS. 10f and g) followed by the second 180° rotation of the core thus winds a second turn about the core and unwinds a second half-turn of wire from the shuttle. In the preferred embodiment illustrated, the core is rotated through a half-turn and the shuttle reciprocated in alternate feeding and rotating steps until the entire length of wire carried by the shuttle has been wound upon the core. The core 20 is also gradually rotated about its central axis between the strokes of the shuttle 24 so that the successive turns of wire 22 are placed upon the core 20 in the desired relation, whether spaced apart, abutting or overlapping, as may be required in the transformer design.

The length of the shuttle 24 is such that one half of a loop of wire about the shuttle is, to a close approximation, equal to a full turn of the winding on the core. This may not be exact and consequently it may be necessary to reverse the shuttle lengthwise, i.e., turn the shuttle end-for-end, after a number of strokes of reciprocation in order to keep a reasonable length of wire between the shuttle and the core. Apart from such occasional end-for-end reversals, the only motion of the shuttle is one of repeated lengthwise reciprocation.

An apparatus capable of carrying out the steps of the aforedescribed method is shown in FIGS. 1–9 and 11. The apparatus includes a lower or base support 26 for the core 20. Support 26 comprises a pair of opposed side frames 28, 30 which are adjustably secured to a rotatable platform 32. Core supporting rollers 34 are mounted on shafts 36 which extend in bearings 38 affixed to the walls 28, 30. Bearings 38 are adjustably carried in slots 39 in frames 28, 30 so that their position may be adjusted radially of the center of the core to compensate for various core sizes without changing the position of the center hole or window of the core. One of the shafts 36 is provided with a handle 40 whose function will be discussed in greater detail in connection with the operation of the apparatus. The separation between side frames or walls 28, 30 is adjustable so that the support 26 may be adjusted to correspond to various core sizes, with clearance for the windings.

Platform 32 is rotatably supported on table 42 by bearings 44. Upper support 46 is carried by posts 48 secured to the table 42 exteriorly of the rotatable platform 32. Upper support 46 is removably held on the posts 48 and is removed when loading and unloading the apparatus.

Rotatable core support 52 is pivotally mounted at the center of the upper support 46 upon a hollow shaft 54 (see FIG. 4). Shaft 54 is fixed to bearing collar 56 that rests on bracket 46 to carry core support 52. Shaft 54 has a slot 54a in line with a like slot (not shown) in bearing 56, so that one position of shaft 54 lines up the slots in the shaft and in the bearing collar. The slot in bearing 56 is contiguous with a slot (not shown) formed in the bracket 46. A slotted shuttle carrier 55 is affixed to the upper end of shaft 54. The slot 55a in shuttle carrier 55 is in line with slot 54a in shaft 54. In the position shown in FIG. 1 the various slots of the fixed and rotatable portion of the apparatus are aligned to form a passage 57 from the exterior of the apparatus to the center of shaft 54.

The core support 52 includes a pair of channel members 58 which are secured to a collar 60 carried by shaft 54 with a slot in the collar (not shown) aligned with the slot 54a in the shaft. The channel members 58 are oppositely disposed about shaft 54 with their longitudinal axis parallel to the slot 54a in the shaft. Opposed core support rollers 62 are affixed to channel members 58, and are adjustable therealong to allow for various core widths. The rollers 62 are removably secured by bolts 64 to the channel members 58 so that a wire 22 may be passed between the members 58 into the center bore of the shaft 54a.

Platform 32 is rotated by means of main shaft 66, which depends beneath the platform 42 and is coaxial with hollow shaft 54. Synchronized rotation of upper core support 52 and platform 42 is accomplished by the following mechanism, best shown in FIG. 3. External drive shaft 68 is notably supported at its upper end from an extension 70 (FIG. 1) of bracket 46 and at its lower end by a bracket 71 extending from platform 42. Sprocket 72 affixed to the main shaft 66, is connected to sprocket 74 on drive shaft 68 by a chain 76. Sprocket 78 on shaft 54 has a slot (not shown) contiguous with and connecting to slot 54a in the shaft and is connected to the sprocket 80 on drive shaft 68 by chain 82. Chain 82 is provided with removable links so that it may be temporarily disassembled to allow wire 22 to be positioned in the bore of shaft 54. Drive shaft 68 is rotated by the drive gear arrangement 84 and handle 86.

Where a short length of wire is involved, wire 22 may be wound upon a single shuttle 24. Referring to FIGS. 1 and 8, a typical shuttle 24 comprises a pair of opposed longitudinally extending side plates 88 which are secured to a number of spacer portions 90 by suitable means. The width and height of the shuttle are selected so that the shuttle may pass through the window in the core during the winding operation. The length of the shuttle and spacers may be varied to accommodate different lengths of wire as required by the transformer being wound. In the preferred embodiment, the length of a turn of wire about the shuttle is at least equal to twice the length of the turn wound about the core.

Where the amount of wire for a winding to be placed upon the core is greater than that which can be accommodated by a single shuttle within the previously described restrictions, it is of special advantage to employ two shuttles to apply the continuous length of wire. The wire is wound upon two shuttles starting from the free ends of the wire and winding it about the shuttles toward its midpoint. The manner in which the "two-shuttle" method functions as distinguished from the previously described single shuttle method will be discussed in detail later. Roller conveyors 92 are provided to assist in carrying the winding shuttle 24 toward and away from the core 20. The shuttle is moved by suitable means, as by hand, toward, through and away from the core. In the apparatus shown in the drawing, the conveyors 92 comprises a channel frame 94 within which a plurality of rollers 96 are journaled at their ends. The rollers 96 are notched at 98 to provide clearance for the shuttle 24 (FIG. 8). It is contemplate that power means may be used to move the shuttle along the conveyor 92, either by powering the conveyor or by providing external means.

Wire snubbers 100, which form the wire 22 against the core as it is wound, are pivotally mounted on the posts 48 (see FIG. 7). These snubbers are constrained to a desired position relative to the core 20 by torsion springs 102. Snubber shaft 104 is slidable within housing 106 against which the torsion spring 102 reacts. Adjustable stops 108 on shaft 104 are provided to control the extension of the shaft 104 and roller 110 which is carried at the end of the shaft 104. The shaft 104 is maintained in its extended position by compression spring 112. The periphery of each roller 110 is wide enough to contact several wires on the core and to roll them against the core. The roller may be of steel but is advantageously fabricated from slightly resilient material as for example nylon or Teflon which are relatively rigid plastic materials.

Reference will now be made to a typical cycle of operation of the present machine, to facilitate a more thorough understanding of the invention. In carrying out the winding of a core 20 with either a single shuttle 24 or with a double shuttle 24a and 24b, as will be later described, a core is loaded into the support frame 26. To facilitate this, one of the rollers 34 and its shaft 36 may be removed, and restored after the core is in place.

Figure 2:
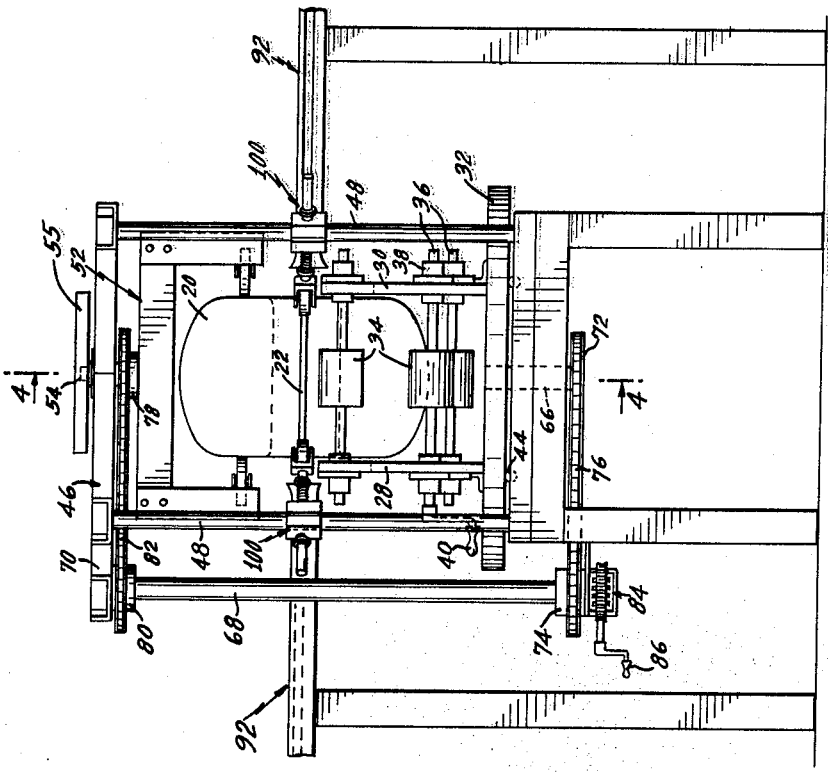
FIG. 2 is a front elevation view of the apparatus of FIG. 1.
Figure 3:
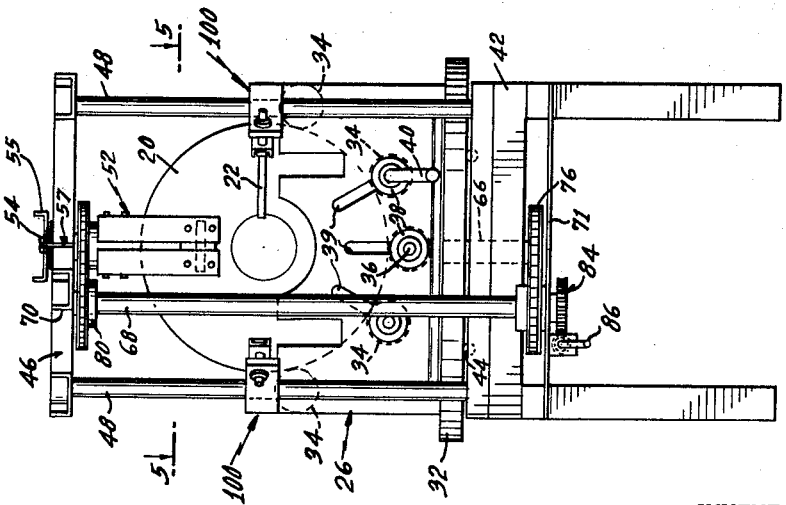
FIG. 3 is a right-hand end view of the apparatus of FIG. 1 with the shuttle conveyor omitted and other parts broken away in the interest of simplicity and clarity.

The core 20 is placed in the apparatus between the side plates 28, 30. The upper core support 46 is placed on the posts 48 with the rollers 62 disposed on opposite sides of the core. Chain 82 is reconnected so that the rotation of the upper and lower core supports 26 and 46 will be synchronized with one another (FIGS. 2 and 3). Lower support 26 and upper support 46 position the core 20 with its central axis (axis of symmetry) lying in a given plane. In the embodiment shown in the drawings, this plane is a horizontal plane. The core-supporting apparatus is rotatable about a vertical axis, passing through shafts 54 and 66, which is perpendicular to the given plane. The upper and lower supports also center the core 20 relative to the vertical axis.

In carrying out the aforedescribed "single shuttle" method, a predetermined length of wire equivalent to the length of a particular number of turns of a winding, is wound upon the shuttle 24 (which may be two or more shuttles joined end-to-end to achieve the desired wire capacity). The particular number of turns may be equivalent to a complete winding or a portion thereof since several sets of windings may be connected in parallel in certain transformer configurations. While, preferably, half the circumference of the shuttle is substantially equal to the length of a single turn on the core, it may be advantageous to increase the length of the shuttle to reduce the number of bends necessarily made in the wire in preliminarily winding it about the shuttle.

The shuttle 24 is placed on a conveyor as, for example, roller conveyor 92, and the free end of the wire 22 is temporarily secured, as by taping, to the exterior of the core (FIG. 10a). The end may be connected to a terminal or to another winding later. The shuttle is passed through the core aperture (FIG. 10b) and to the opposite side of the core (FIG. 10c). The core is rotated about its vertical axis 180°. The rotation is produced by the drive gears 84 through shaft 68. Shuttle 24 is passed back through the core drawing the wire 22 with it. It is not necessary for the shuttle to be turned end-for-end to either take up the slack in the wire or to pay out additional wire. In that event the circumference of the shuttle approximates two turns around the core, or one turn about the core equals approximately the length or half the circumference of the shuttle. However, turning the shuttle end-for-end will either take up the wire or lengthen it as required. The entire wound length of wire is transferred from the shuttle to the core by successive rotations of the core and passes of the shuttle.

Figure 5:
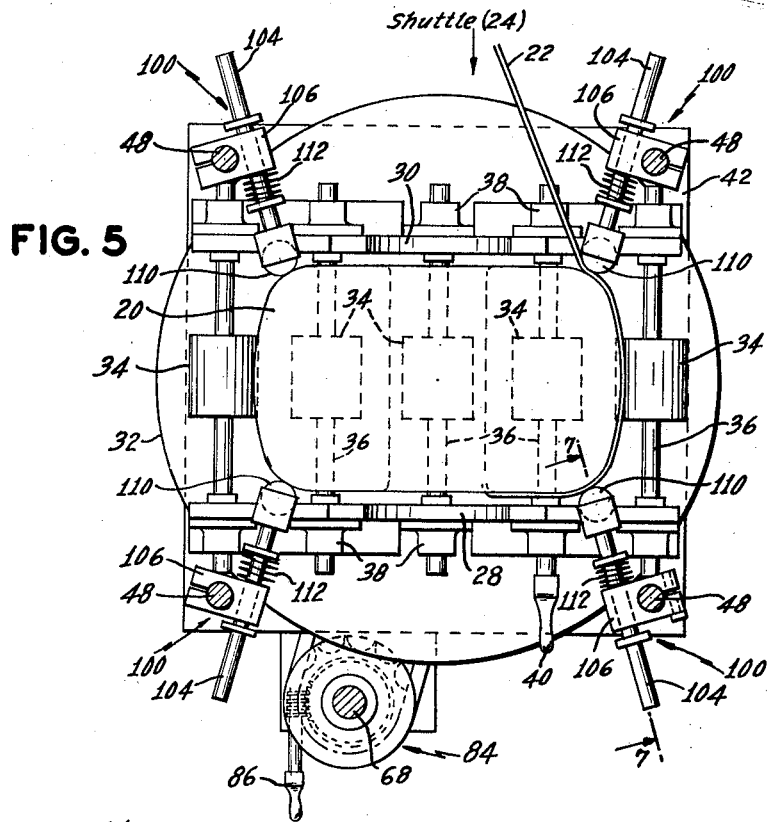
FIG. 5 is a plan view on an enlarged scale and in section taken along the line 5—5 of FIG. 3 showing one stage in the winding operation.
Figure 6:
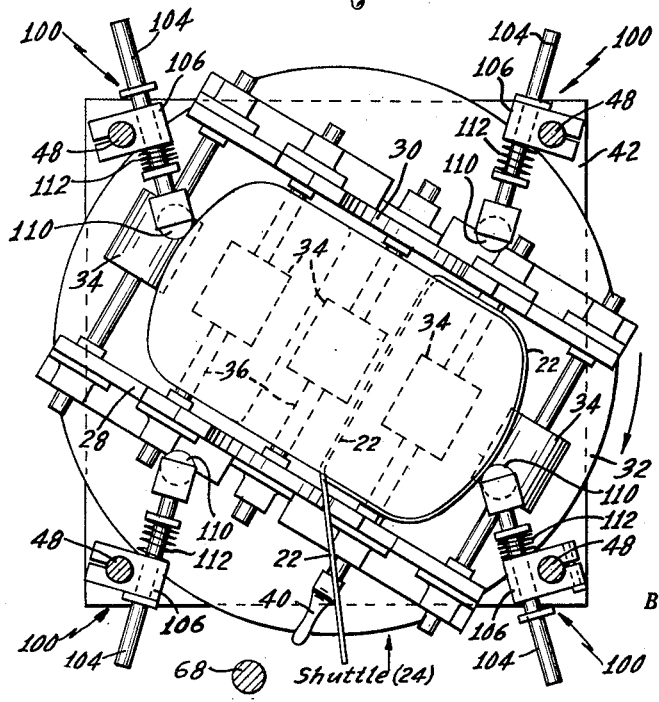
FIG. 6 is a view similar to FIG. 5 at a subsequent stage in the winding operation.

Referring to FIGS. 5 and 6, the snubbers 100 form the wire 22 against the core 20 as the core is rotated. Effectively, the wire is passed from one snubber to the next by the rotation of the core. The snubbers maintain the last wound turns in position on the core as the shuttle is reciprocated. The torsion springs 102 (FIG. 7) swing each snubber roller 110 into the path of the core and the compression springs 112 force the roller against the wire and the wire against the core.

It is advantageous for the core to be rotated step-wise about its central axis between reciprocations of the shuttle so that succeeding turns of the wire may be placed on the core adjacent the previously wound turn. This is accomplished by means of one of the supporting rollers 34 which frictionally engages the core as can be seen in FIG. 11. The core is revolved about its central axis a peripheral distance equivalent to the width of the wire. This movement may occur either intermediate the rotation of the core about the vertical axis of the apparatus or simultaneously therewith. The reciprocating movements of the shuttle intermediate the step-wise 180° rotation of the core (FIGS. 10a to i) are continued with the wire being laid against the core in a desired configuration, until the length of wire wound on the shuttle has been exhausted. The end of the wire is then temporarily taped to the core. Subsequent windings may be positioned on the core by repetition of the "single-shuttle" method previously outlined above and may be connected to either the previously wound turns or to a terminal. The wound core is removed from the apparatus by reversing the loading procedure described above.

In some circumstances, the length of wire to be wound for a particular winding must be in one piece and is such that it is most advantageous to employ two shuttles. In the "two-shuttle" method, the length of wire is wound upon two shuttles starting from the free ends of the wire and winding toward the center thereof. The core is positioned as before and the first or "A" shuttle 24a is positioned in carrier 55 (FIG. 4) on shaft 54. The slots in the carrier 55, shaft 54, collar 56, sprocket 78, yoke support bushing 60, are aligned and a core support roller 62 and sprocket chain 82 are removed and the wire 22 is led through the slots. The sprocket chain 82 and the core support roller 62 are then replaced. The "B" or second shuttle (not shown) is placed on the conveyor 92 and passed through the core aperture. The wire 22 is then taped to the core 20 where it passes through the aperture and the winding operation proceeds as previously described for the single shuttle method. The "A" shuttle 24a, carrier 55, support 52, and core 20 rotate together therefore no twisting of the wire occurs between the shuttle and the core. When the "B" shuttle is exhausted, the "A" shuttle is then employed to finish the winding. The shuttle is removed from the carrier 55 by passing the wire through the various aligned slotted members once the sprocket chain 76 and core support roller 62 have been removed. If the "B" shuttle has been wound onto the core with a clockwise rotation of the core then the "A" shuttle is wound on the core in a counter-clockwise direction so that the turns remain in their proper relative position on the core. The core is rotated about its central axis during the winding so that subsequent turns may be placed next to one another in a spiral, serial manner. When the "B" shuttle has been emptied and the free end taped to the core, the taped midpoint is returned to the starting position and the core rotated in the reverse direction for the "A" shuttle.

The method, and apparatus for carrying out the method herein described, allow, for the first time, the production of distribution power transformers having toroidal cores.

Although several embodiments of the invention have been shown and described, it will be apparent to those skilled in the art that various changes and modifications may be made therein without departing from the spirit of the invention.

What I claim is:

1. A method of winding a power transformer having a core with a central axial aperture comprising the steps of positioning the core with its central axis lying in a given plane, preliminarily winding a length of wire into a configuration capable of being passed through the central aperture in said core, securing a portion of said wire against movement relative to said core, rotating said core through substantially one-half of a revolution about an axis normal to said given plane, drawing said wire taut whereby said wire is drawn against said core, passing said wound length of wire through said core, rotating said core in the same direction through substantially one-half a revolution once again, and repeating said alternate passing and rotating steps until said wire has been wound about said core forming a winding thereon.

2. A method of winding a power transformer having a core with a central axial aperture comprising the steps of positioning the core with its central axis lying in a given plane, preliminarily winding a length of wire into a pair of joined configurations each capable of being passed through the aperture in said core, securing said wire to said core intermediate said configurations thus creating wound first and second half lengths, rotating said core relative to said first half of said wound length whereby said wire is drawn against said core, passing said first half of said wound length of wire through said core, rotating said core relative to said first half of said length of wire once again, repeating said alternate feeding and rotating steps until said first half of said wire length has been wound about said core forming a partial winding thereon, rotating said core relative to said second half of said wound length, passing said second half of said length of wire through said core, rotating said core relative to said second half of said wound length, and repeating said alternate passing and rotating steps until said second half of said wound length of wire has been wound about said core thereby completing said previously partial winding thereon.

3. A method of winding a power transformer having a core with a central axial aperture comprising the steps of positioning the core with its central axis lying in a given plane, securing one portion of a wound length of wire to said core, passing said wound length of wire through the aperture in said core thereby threading said wire through said core, rotating said core 180° about an axis normal to said given plane whereby said wire is drawn against said core, passing said wound length of wire through the core to its original position, rotating said core once again, and repeating said alternate passing and rotating steps until said wire has been wound about said core forming a winding thereon.

4. A method of winding a power transformer having a core with a central axial aperture comprising the steps of positioning the core with its central axis lying in a given plane, securing a portion of a wound length of wire of a given diameter to said core, passing said wound length through the aperture in said core thereby threading said wire through said core, rotating said core 180° about an axis normal to said given plane, angularly indexing said core about its central axis a distance substantially equal to said given diameter of said wire, again passing said wound length of wire through said core and therebeyond whereby said wire is drawn against said core, again rotating said core 180°, and repeating said passing and said 180° rotating and said angular indexing steps until said wound length of wire has been wound about said core forming a winding thereon.

5. A method of winding a power transformer that includes a core having a central aperture comprising the steps of securing a portion of a length of wire against movement relative to the core, the wire being in the form of an elongated coil whose turns extend along the coil and around its ends, and passing said coil in lengthwise strokes of reciprocation through said aperture and indexing said core through a half-revolution between each stroke of the coil and the next stroke, thereby to wind successive turns of wire on said core.

6. A method of winding a power transformer having an annular core with an aperture including the steps of fixing a portion of a conductor against movement relative to said core, reciprocating a relatively long and slender shuttle wound along its sides and about its ends with said conductor through said aperture in alternate traverse and return reciprocating strokes, and relatively rotating said core and said shuttle intermediate said strokes about an axis normal to that of said annular core whereby the conductor is wound on said core forming a winding thereon.

7. A method of winding a power transformer having a central axial aperture including the steps of fixing a portion of a conductor against movement relative to said core, reciprocating a relatively long and slender shuttle wound along its sides and about its ends with the conductor through said aperture in alternate traverse and return reciprocating strokes, rotating said core approximately 180° about an axis perpendicular to the axis of its own aperture and perpendicular to the path of said shuttle intermediate said strokes, and progressively indexing said core about the axis of its aperture, whereby the conductor is wound on said core forming a winding thereon.

8. A method of winding a power transformer having a core with a central aperture comprising the steps of securing one portion of a length of wire to the core, another portion of the wire being supported on an elongated shuttle and wound in the form of a coil whose turns extend along the shuttle and around its ends, passing said shuttle in a lengthwise stroke through the aperture in said core thereby threading said wire through said core, rotating said core through approximately one-half of a revolution about an axis transverse to the path of the shuttle, whereby said wire is drawn against said core, passing said shuttle in another lengthwise stroke through the core to its original position, rotating said core once again through approximately one-half of a revolution in the same direction as before to wind the wire on the core, and periodically reversing the shuttle end-for-end between said lengthwise strokes.

9. A method of winding a power transformer having an annular core with a central aperture, including the steps of winding a length of wire into two integrally interconnected coils each of which is elongated and has its turns extending along its length and around its ends, securing the portion of said wire that interconnects said coils against movement relative to said core, reciprocating one of said coils lengthwise through said aperture in alternate traverse and return strokes, rotating said core approximately 180° between each reciprocating stroke of said coil as aforesaid and the next stroke, the rotation of the core being about an axis perpendicular to that of the annular core and perpendicular to the path of reciprocation, and continuing the reciprocating strokes and the 180° rotations in alternation until the first elongated winding has been wound about the core, the second elongated coil being rotatable with the core during the aforementioned 180° rotations, and thereafter alternately reciprocating the second coil through the aperture of the core and rotating the core in 180° increments as aforesaid until the wire forming the second elongated coil has been wound about said core.

References Cited by the Examiner
UNITED STATES PATENTS

| | | | |
|---|---|---|---|
| 2,102,692 | 12/37 | Franz | 242—4 |
| 2,313,306 | 3/43 | Wiegand | 29—155.57 |
| 2,344,006 | 3/44 | Steinmayer | 29—155.57 |
| 2,640,652 | 6/53 | Harvey | 242—1.1 |
| 2,819,850 | 1/58 | Mathis | 242—4 |
| 2,820,598 | 1/58 | Aveni | 242—4 |
| 2,921,751 | 1/60 | Aveni | 242—4 |
| 2,962,235 | 11/60 | Ridler et al. | 242—4 |
| 2,991,021 | 7/61 | Batty | 242—1.1 |

FOREIGN PATENTS

| | | |
|---|---|---|
| 345,679 | 12/21 | Germany. |

MERVIN STEIN, *Primary Examiner.*
HARRISON R. MOSELEY, *Examiner.*